United States Patent
Tompa et al.

(10) Patent No.: US 6,786,141 B2
(45) Date of Patent: Sep. 7, 2004

(54) VESSEL FOR ELECTRICAL HOUSEHOLD FOOD PROCESSOR CLOSED WITH A PIVOTING REMOVABLE LID

(75) Inventors: Carole Tompa, Tarbes (FR); Jean-Paul Astegno, Espoey (FR); Thomas Lallemand, Lourdes (FR); Lionel Peyras, Jarret (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 10/398,456

(22) PCT Filed: Sep. 27, 2001

(86) PCT No.: PCT/FR01/02989

§ 371 (c)(1),
(2), (4) Date: Sep. 26, 2003

(87) PCT Pub. No.: WO02/28246

PCT Pub. Date: Apr. 11, 2002

(65) Prior Publication Data

US 2004/0045445 A1 Mar. 11, 2004

(30) Foreign Application Priority Data

Oct. 4, 2000 (FR) .............................. 00 12688

(51) Int. Cl.$^7$ ............................. A23N 1/00; A47J 43/07; A47J 43/24; A47J 27/00; B02B 1/06
(52) U.S. Cl. ............................. 99/492; 99/348; 99/510; 366/199; 366/205; 366/314; 241/37.5; 241/92
(58) Field of Search ......................... 99/484, 485, 492, 99/537, 538, 584, 588, 348, 509–513; 366/199–206, 144–146, 209, 210, 314, 601; 241/37.5, 92, 199.12, 282.1, 282.2; 426/443, 478, 601; 220/573.1, 912; 83/411.1

(56) References Cited

U.S. PATENT DOCUMENTS

| | | | | | |
|---|---|---|---|---|---|
| 3,176,968 | A | * | 4/1965 | Appleton | 99/348 |
| 4,111,372 | A | * | 9/1978 | Hicks et al. | 241/37.5 |
| 4,213,569 | A | * | 7/1980 | Amiot | 241/37.5 |
| 4,373,677 | A | * | 2/1983 | Kunihiro | 241/37.5 |
| 4,410,280 | A | * | 10/1983 | Yamauchi et al. | 366/314 |
| 4,471,915 | A | * | 9/1984 | Levin et al. | 241/37.5 |
| 4,569,266 | A | * | 2/1986 | Ando | 83/411.1 |
| 5,809,872 | A | * | 9/1998 | Sundquist | 99/492 |
| 5,852,968 | A | * | 12/1998 | Sundquist | 99/492 |
| 5,934,179 | A | * | 8/1999 | Schmid et al. | 99/337 |
| 6,164,196 | A | * | 12/2000 | Deschamps et al. | 99/513 |
| 6,397,735 | B1 | * | 6/2002 | Wong | 99/492 |
| 6,418,837 | B1 | * | 7/2002 | Obersteiner | 99/509 |

FOREIGN PATENT DOCUMENTS

| | | |
|---|---|---|
| EP | 0 556 467 | 8/1993 |
| EP | 0 812 560 | 12/1997 |
| GB | 2 217 802 | 11/1989 |
| JP | 11-276913 | 10/1999 |

* cited by examiner

Primary Examiner—Timothy F. Simone
(74) Attorney, Agent, or Firm—Browdy and Neimark, P.L.L.C.

(57) ABSTRACT

The invention concerns a working chamber for an electrical household food processor, comprising a vessel (1) and a lid (3), the vessel and the lid comprising hinge means (10). The invention is characterised in that the hinge means (10) comprise two matching nesting surfaces (7, 8), one (7) integral with the lid (3) and the other (8) integral with the vessel (1), having at least along one pivot axis a series of at least partly circular sections perpendicular to said pivot axis.

14 Claims, 6 Drawing Sheets

Figure 1:
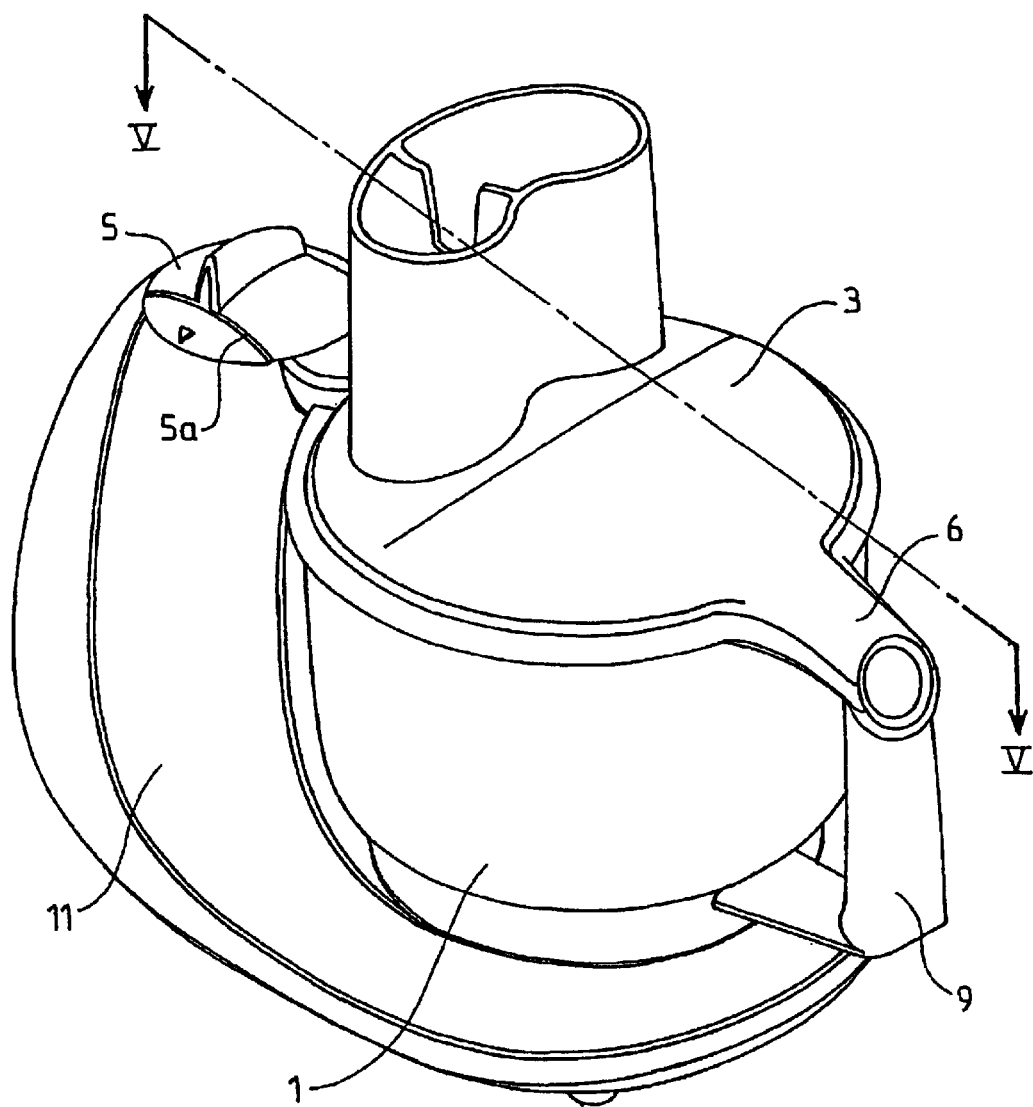

VESSEL FOR ELECTRICAL HOUSEHOLD FOOD PROCESSOR CLOSED WITH A PIVOTING REMOVABLE LID

The present invention concerns the general technical field of electrical household food preparation appliances such as particularly multifunction household food processors or even blenders provided more particularly for the preparation of liquids. The present invention relates to a vessel provided with a removable closing lid comprising hinge means for articulating the lid the on the vessel.

Such a vessel is particularly intended to be associated with a household food processor in which food products are finely divided, mixed and/or emulsified by an appropriate tool fixed to a shaft that projects from the center of the bottom of the vessel and is driven by an electric motor. It is thus necessary that the lid suitably cover the vessel in order to prevent the food products from leaving the vessel during the course of processing. It is also necessary that the opening and the closing of the lid be easy to perform and that the lid not be in the way during removal of the food products from the vessel.

There are known particularly in the prior art household food processors in which the lid is locked onto the vessel or onto the housing of the appliance by means of jaws. Such appliances have a high fabrication cost. There are equally known food processors in which the lid is locked onto the vessel by means of a bayonet closure. This manner of closing is however not easy to use.

There has already been proposed in the document U.S. Pat. No. 4,111,372 a household food processor in which a hinge is formed by a tenon extending from the lid, engaged in a longitudinal cut-out of the vessel. Insertion of the tenon into the cut-out is not easy to perform and requires good eyesight and a certain dexterity. In addition, this manner of connection presents sealing problems.

The document EP 0556467 relates to a food processor of which the lid is articulated on the vessel by a hinge, while the document EP 0812560 discloses an arm articulated to the outside of the vessel to which a lid is connected in a removable manner, requiring the fabrication of two separate parts.

One can note that there exist articulated lids, lids connected in a removable fashion to the vessel of the food processor, a lid connected in a removable manner to an articulation arm. In contrast, one does not find a lid that is at the same time articulated and connected in a removable manner to the vessel, assuring an easy placement and a reliable and easily controllable closing of the lid on the vessel, using a minimum of parts reducing at the same time the number and duration of operation for assembling the appliance.

The object of the present invention is to provide a solution permitting use of the appliance to be simplified, while reducing the number of parts to be fabricated and consequently also reducing the time for assembling the appliance.

To this end, the present invention has for its object a working enclosure for an electrical household food preparation appliance comprising a vessel and a lid, the vessel and the lid having articulation means, wherein said articulation means have two complementary nesting surfaces, one integral with the lid and the other integral with the vessel, presenting along at least one pivot axis a series of at least partially circular sections perpendicular to said pivot axis. The advantage of this invention resides in the fact that the complementary nesting surfaces permit at the same time connecting the lid in a removable manner while permitting it to be articulated to the vessel. The at least partially circular sections can form a circle or even one or several arcs of a circle, or even envelop the above-cited forms in the case of undulating, ribbed or embossed surfaces.

According to a preferred version of the invention, the complementary nesting surfaces are respectively male and female, or in other terms, convex and concave, for example semicylindrical or even hemispherical, such a conception permitting the construction of the lid and of the vessel, as well as their cleaning, to be facilitated. The male and female surfaces can arbitrarily belong to the lid or the vessel.

Forms of construction relating to an alternative version can however be envisioned, such as articulation means formed on the vessel as on the lid by coaxial disks of the same diameter, spaced apart and connected to their immediate neighbors by a wall covering one quarter to their periphery.

According to a preferred embodiment of the preferred version of the invention, the female nesting surface is formed by a concave surface extending at most over an angle of substantially 180°. Such a design of the complementary male and female nesting surfaces permits removal and replacement of the lid in a very simple and reliable manner without favoring one particular direction for placement or withdrawal. It also permits a good guiding of the lid along the circular path with respect to the vessel.

Preferably, said concave nesting surface is integral with the vessel, at least a portion of this surface being situated above a plane parallel to the upper edge of said vessel and passing through the center of curvature of said concave surface, alternatively, said concave nesting surface is integral with said lid, at least a portion of this surface being situated below a plane parallel to the upper edge of said vessel and passing through the center of curvature of said concave surface. This arrangement permits retention of the lid during a translation along the axis of the vessel.

According to a preferred form of the invention, the complementary nesting surfaces are hemispherical surfaces. Due to this arrangement, the lid can be articulated about a multitude of axes converging at the center of the spherical nesting surfaces.

According to another embodiment, the male nesting surface has a free end provided to be engaged along the pivot axis against the female nesting surface. This arrangement equally permits obtaining a lid that is removable from the vessel while assuring a guiding during rotation of the lid. The concave surface can then extend over more that 180°.

Advantageously, the male or female nesting surface integral with the lid is situated at the end of an arm that projects toward the outside. This arrangement permits the articulation surfaces to be easily visible. Thus, if these surface are not nested in one another, the lid lifts during the engagement of the locking means located substantially opposite, indicating to the user that the lid is not correctly closed.

Preferably, the male or female nesting surface integral with the vessel is arranged on a handle of the vessel. On the one hand, this arrangement permits the articulation means to be extended toward the outside, on the other hand, this complementary nesting surface can be constituted by an appropriate shaping of a portion of a handle and can thus be integrated therewith.

According to a particularly advantageous form of the invention, the lid has an inner or outer annular nesting surface, extending perpendicular to the plane formed by the edge of the lid adjacent to the edge of the vessel and dimensioned to be nested at the inside or the outside of the opening of the vessel, the dimension of this surface perpendicular to said plane formed by the edge of the lid being smaller in its part opposed to the articulation means, or in its part closest to the articulation means. Due to this or these annular nesting surfaces, the lid is guided with respect to the opening of the vessel. This arrangement is useful particularly when the male and female nesting surfaces of the articulation means are formed by convex and concave hemispherical surfaces permitting the lid to be caused to pivot around a multitude of convergent axes.

According to a variant of the preceding characteristic, preferably, the lower edge of the annular nesting surface has at least one recess while the inner wall of said vessel has at least one positioning projection disposed to come to engage with said recess when the lid is in position for closing the vessel. This arrangement permits the positioning role of the annular nesting surface, integral with a lid, to be improved.

The present invention equally has for its object an electrical household appliance for food preparation having a housing forming a base for receiving a vessel closed by a lid, the vessel and the lid having articulation means, locking means to maintain the lid in its closing position on the vessel being provided on the housing in order to cooperate with a locking surface of the lid, by the fact that the vessel and lid form a working enclosure in accordance with the preceding arrangements.

Advantageously, then, the articulation means have a concave nesting surface integral with the vessel, or with the lid, at least a portion of this surface being located above, or below, a plane passing through the center of curvature O of said concave surface and through the bearing point of the locking means on the locking surface of the lid when said locking means lock the articulated lid on the vessel in the closed position. This arrangement permits a locking at two points to be obtained.

Advantageously also the locking means come to bear on the lid in a region diametrically opposed to the articulation means, this arrangement permitting an effective locking to be obtained at only two points, the locking means and the articulation means.

Advantageously also, the locking means come to bear on the top of the lid, this arrangement permitting the design of the appliance to be simplified.

Figure 2:
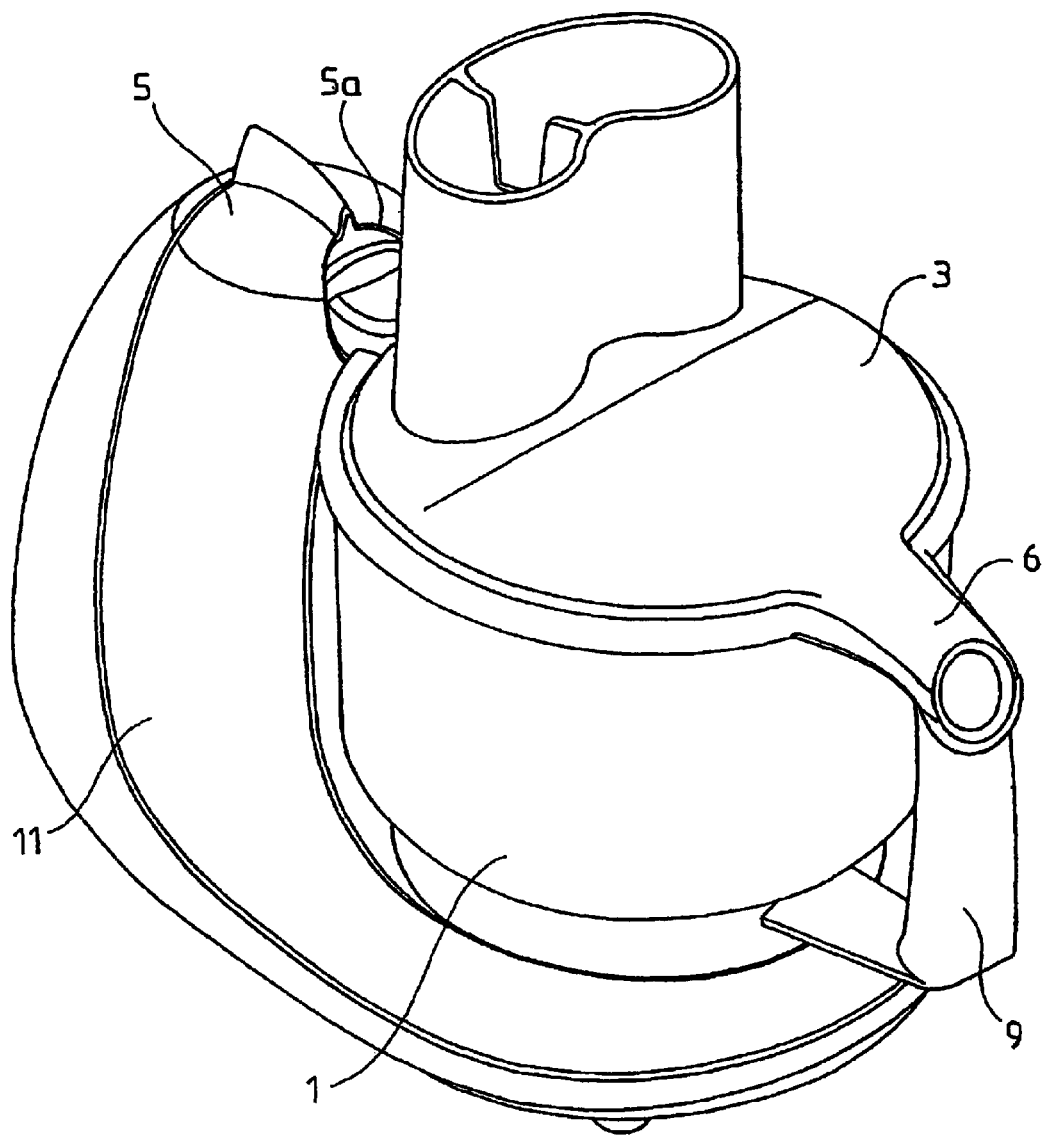
Figure 3:
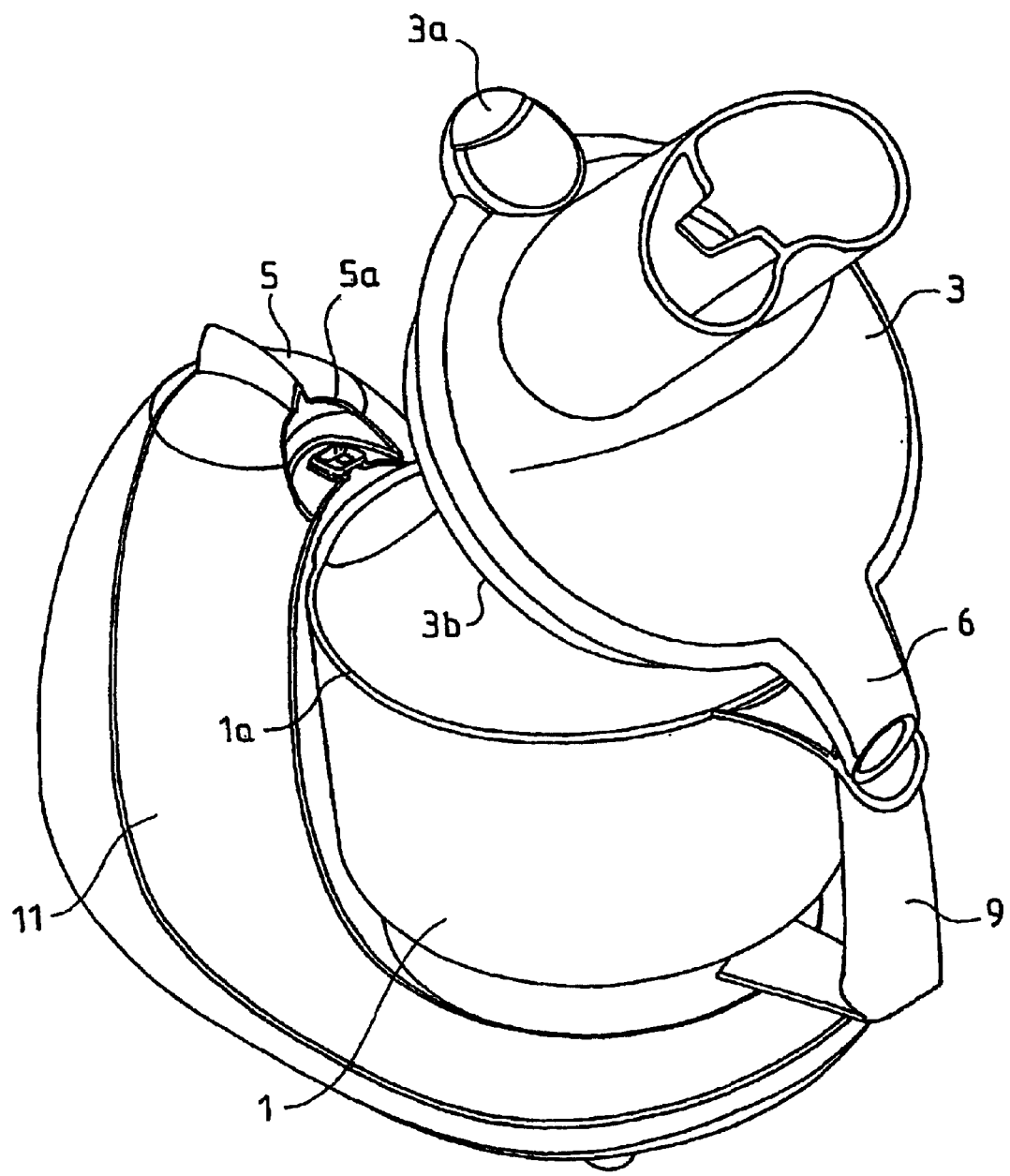
Figure 4:
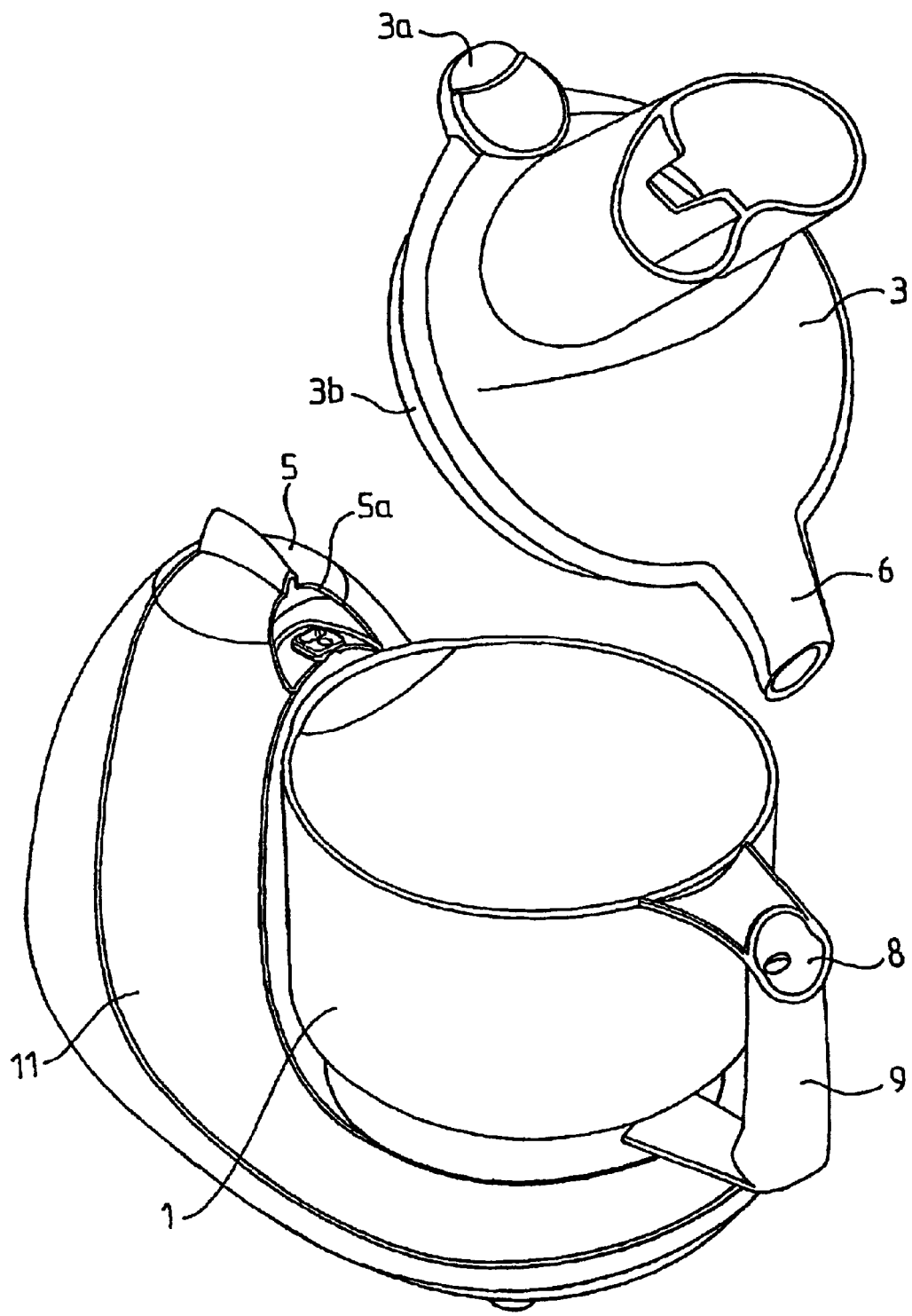
Figure 5:
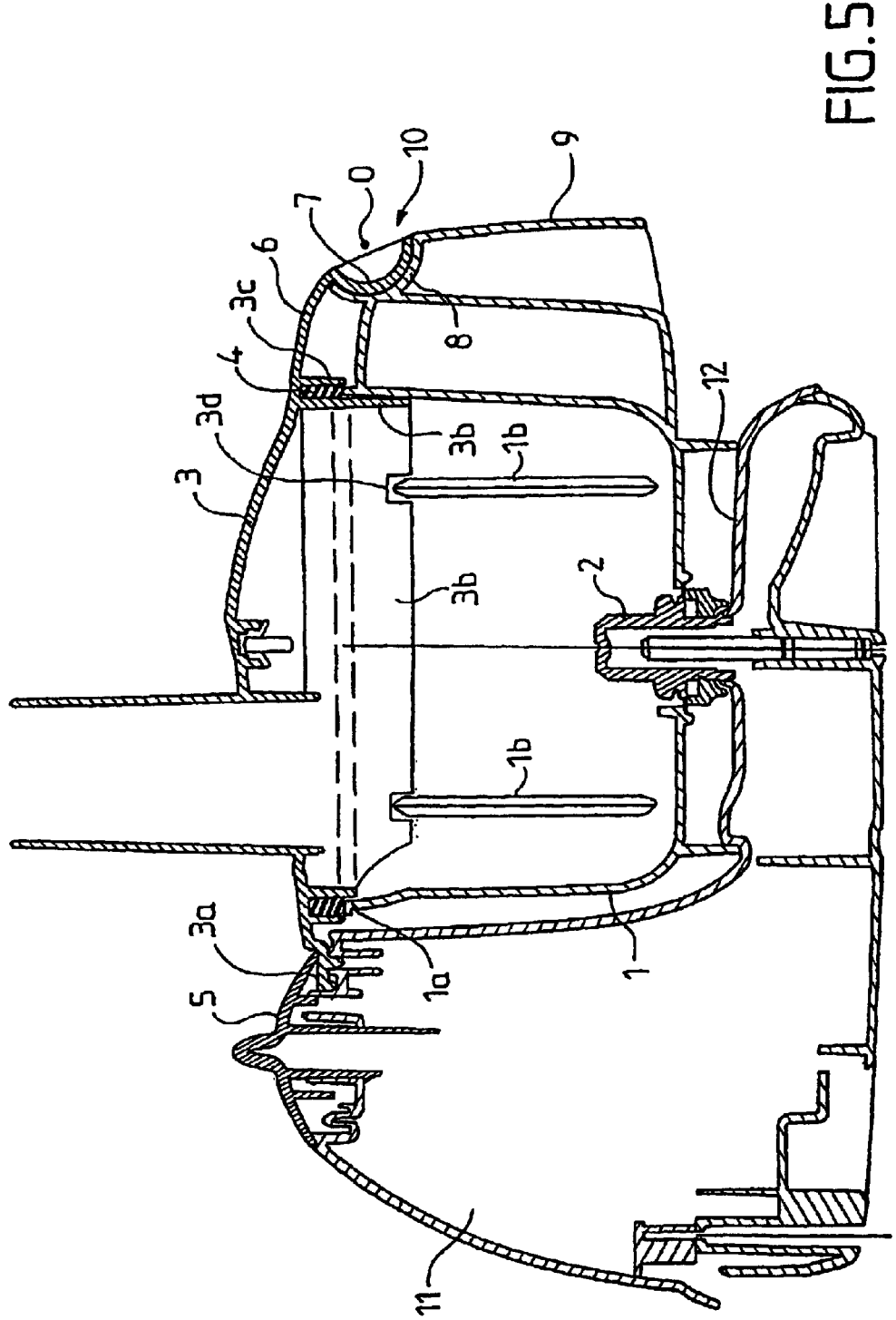
Figure 6:
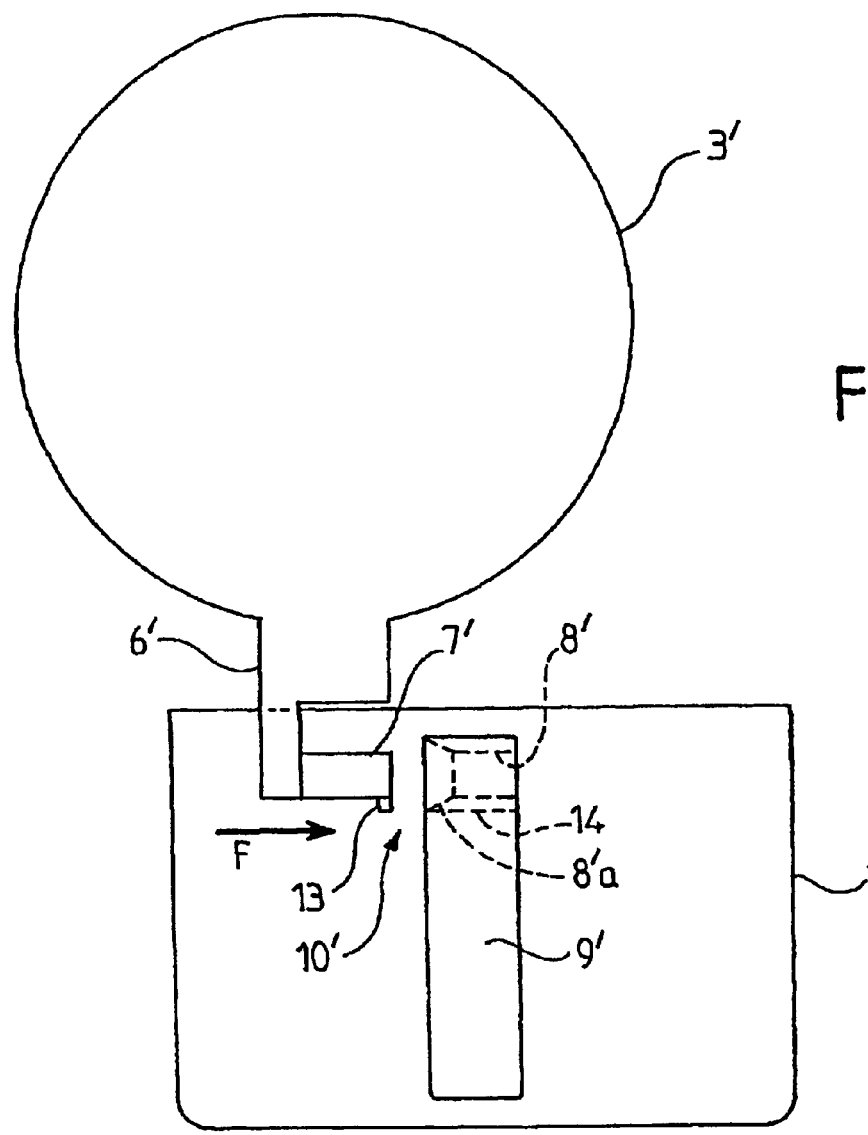

The invention will be better understood from the study of one form of construction and of variants of a vessel provided with a closing lid, object of the present invention, described hereafter, with an example that is not in anyway limiting and illustrated schematically by the attached figures in which:

FIG. 1 is a perspective view of this form of construction, the lid being closed and locked on the vessel, FIG. 2 is a view similar to that of FIG. 1, the lid being closed and unlocked, FIG. 3 is a perspective view of this form of construction, showing the lid spaced from the vessel by pivoting around the pivoting means, FIG. 4 is a perspective view of this form of the construction, showing the lid separated from the vessel, FIG. 5 a cross-sectional view along the line V—V of FIG. 1, FIG. 6 is a schematic, elevational view of a first variant of the form of the construction of FIGS. 1–5, FIG. 7 is a schematic side view in cross-section of a second variant of the form of constuction of FIGS. 1–5.

Vessel 1 illustrated in FIGS. 1–5 is a vessel of a household food processor, the bottom of which (FIG. 1) is associated with pivot means 2 of a rotatable tool (not shown) intended to come into engagement with drive means (not shown). The invention relating to the working enclosure formed by vessel 1 and its closing lid 3, the mechanism of the household food processor does not form a part of this invention and its description is not necessary to an understanding of the present invention.

As illustrated in FIG. 5, in the closing position, lid 3 is maintained against the opening edge 1a of vessel 1. A seal 4 housed in an annular housing arranged under lid 1 serves to assure sealing between edge 1a of vessel 1 and lid 3. Locking means formed by a disk 5 mounted rotatably at the top of housing 11 of the household food processor serve to maintain the edge of lid 3 against edge 1a of the vessel 1. Locking disk 5 has a cut-out 5a corresponding substantially to a chord of the circle by the this disk 5. When locking disk 5 is turned into the position shown in FIG. 1, it covers a locking surface 3a arranged on the upper face of lid 3 (FIGS. 3, 5), while when turning this locking disk 5 by 90° in order to bring it into the position illustrated in FIGS. 2 and 3, cut-out 5a is brought opposite to locking surface 3a of lid 3 in a manner such that locking disk 5 no longer covers locking surface 3a of lid 3 and frees the latter.

Diametrically opposite to the locking device that has just been described, lid 3 has, in this example, a radial arm 6 that terminates with a nesting surface 7 forming a hemispherical portion (FIG. 5), the convex surface of which is nested into a complementary nesting surface 8 forming a concave hemispheric portion, with the same radius as that of the convex surface of the hemispherical portion of the lid, said concave nesting surface 8 being arranged, in this example, at the upper end of a handle 9 provided for gripping vessel 1.

These two complementary surfaces 7, 8 nested in one another form articulation means 10 between vessel 1 and lid 3 and permit lid 3 to be turned with respect to vessel 1 when locking disk 5 frees lid 3. Due to the hemispherical surfaces, rotation of lid 3 with respect to vessel 1 can be done not only around a determined pivot axis, but also around a multitude of pivot axes converging at the center of curvature O of hemispherical nesting surfaces 7 and 8. In addition, nesting of the two surfaces forming articulation means 10 is facilitated, the center of the convex surface being directed toward the center of the concave surface by the edges of the concave surface.

As shown in particular in FIG. 5, it can be observed that concave nesting surface 8 integral with vessel 1 has a portion located above a plane passing through the center of curvature O of said concave surface and through the bearing point of locking means 5 on locking surface 3a of lid 3 when said locking means lock lid 3 articulated on vessel 1 in the closed position.

As an example of a variant, it is obvious that one could reverse the convex and concave surfaces by forming the convex surface on handle 9 of vessel 1 and the concave surface on arm 6 of lid 3. In this case, at least a portion of the concave nesting surface integral with lid 3 is then situated below a plane passing through the center of curvature O of said concave surface and through said bearing point, to retain lid 3 on vessel 1 in the locking position of locking disk 5.

As illustrated in FIG. 4, due to the mode of articulation of lid 3 on vessel 1, lid 3 can not only pivot on vessel 1 but can be separated therefrom and then replaced without difficulty by separating one from the other, and then nesting in one another, hemispherical nesting surfaces 7 and 8, which does not present any problem, taking into account the size of these surfaces and the fact that they are situated preferably, as in the example illustrated, at a certain distance from the edge of vessel 1.

Given the great freedom of movement provided by the ball-and-socket articulation between lid 3 and vessel 1, return of lid 3 into the locking position can possibly present a problem regarding the orientation of lid 3 with respect to the locking position. To this end, as shown in FIG. 5, the lower face of lid 3 advantageously has an interior annular nesting surface 3b that extends perpendicularly to the plane form by the edge of lid 3 adjacent to edge 1a of vessel 1, forming a sort of skirt, in such a manner that it permits lid 3 to be conveniently oriented on vessel 1 during closing of the lid. Preferably, the height of this internal annular nesting surface 3b is smaller in proximity to locking disk 5 than to the convex, concave pivoting surface 7, 8, in order to facilitate closing of cover 3 by pivoting around pivot or articulation means 10.

The interior face of the lid 3 also has an exterior annular nesting surface 3c, providing to be nested at least partly around upper edge 1a of vessel 1 and equally permitting guidance of the mounting of lid 3 on the vessel 1. Preferably, the height of this exterior annular nesting surface 3c is smaller in proximity to the convex, concave pivot surfaces 7, 8, than to locking disk 5, in order to facilitate closing of lid 3 by pivoting around pivot or articulation means 10.

Seal 4 is for example mounted in the housing formed by annular nesting surfaces 3b and 3c.

According to another variant, positioning ribs 1b can be arranged to project on the internal wall of the vessel 1 (FIG. 5). Recesses 3d can be provided in the lower edge of annular nesting surface 3b of lid 3. These recesses 3d are positioned to correspond with ribs 1b, in a manner such that these ribs 1b come to engage into recesses 3d when the lid is in the correct closed position on the vessel. It is question there of complementary means at interior annular nesting surface 3b, to assure a placement of lid 3 in a sufficiently precise position on vessel 1 to permits its locking.

Of course, the invention is not limited to nesting surfaces 7, 8 having a hemispherical form, and is applicable equally to nesting surface that would be cylindrical, semicylindrical, or even in a more general manner nesting surfaces having surface portions presenting, along a pivot axis, a series of sections that are at least partial circular.

The invention encompasses particularly a variant (FIG. 6) in which the male nesting surface would be constituted by a pin 7' arranged at the end of the radial arm 6' of lid 3', while handle 9' would be traversed by a cylindrical passage 8', constituting the female nesting surface of articulation means 10'. It is then sufficient to introduce pin 7' into passage 8' as indicated by arrow F to assemble lid 3' onto vessel 1'. The entrance to cylindrical passage 8' could be proceeded by a guide cone 8'a to facilitate to introduction of pin 7'. In a preferred manner, the length of pin 7' is greater than the length of passage 8' and the pin carries laterally at its end a lug 13, provided to slide in a groove 14 provided in passage 8' during introduction of said pin into said passage, and to come to bear against a lateral wall of handle 9' of vessel 1' during rotation of lid 3'. Lug 13 and groove 14 are for example arranged to permit installation of lid 3' when this latter occupies a vertical position.

Figure 7:
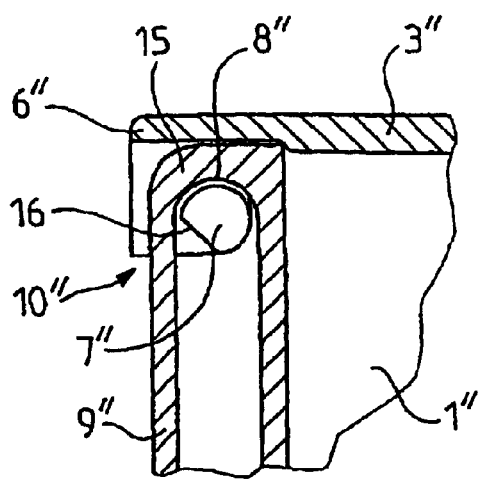

By way of a complementary variant, it is not necessary that the pin constituting the male nesting surface have a totally cylindrical cross-section, nor that the passage constituting the female nesting surface of the articulation means form a cylindrical bearing. FIG. 7 shows another variant in which passage 8" constituting the female nesting surface of the articulation means 10" is formed by the lower face of an upper post 15 connecting handle 9" to vessel 1" in which pin 7" constituting the male nesting surface extends from radial arm 6" of 3" and presents a planar surface portion 16 in a zone that is not involved in the pivoting. A lug (not shown in FIG. 7) can also be provided at the end of pin 7" to come to engage with handle 9", post 15 or vessel 1". Handle 9" can equally have a greater separation from vessel 1" in its lower part, in order to facilitate insertion of pin 7".

The generatrix of the male and female nesting surfaces of the articulation means is not necessarily a portion of a circle, as in the example of the construction shown in FIGS. 1 to 5, nor a straight portion parallel to the pivot axis, as in the variants presented in FIGS. 6 and 7, but can notably be a straight portion cutting the pivot axis, to then form a conic portion, or even be an elliptical portion, to form a portion of an ellipsoid.

The cross sections of the male nesting surfaces can be circular, i.e. extend over 360°, in the case of nesting surfaces having constant or decreasing cross sections, engaged in a direction corresponding to the pivot axis of the articulation means. However, cross sections that are at least semicircular permitting an engagement in directions different from that of the pivot axis of the articulation means are of much less limited utility, the user being able to simply place the nesting surface against one another. In a preferred manner, the nesting surfaces then have with respect to the pivot axis cross sections whose diameter varies in a progressive manner, in order to guide without any significant effort to the user the nesting surfaces during assembly of the articulation.

The locking surface of the lid is preferably disposed in a manner diametrically opposite to the articulation means, in order to simply the fabrication of the locking means of the appliance. However, the locking surface is not necessarily arranged on the upper face of the lid.

What is claimed is:

1. A working enclosure for an electrical household food preparation appliance comprising a vessel (1;1';1") and a lid (3;3';3"), the vessel and the lid having articulation means (10;10';10"), characterized in that the lid (3;3';3") is removable from the vessel (1;1';1"), the articulation means (10;10';10") have two complementary nesting surfaces (7,8;7', 8';7", 8"), one (7;7';7") integral with the lid (3;3';3") and the other (8;8';8") integral with the vessel (1;1';1"), presenting along at least one pivot axis, at least one partially circular section perpendicular to said pivot axis.

2. Enclosure according to claim 1, characterized in that the complementary nesting surfaces are respectively male (7;7';7") and female (8;8';8").

3. Enclosure according to claim 2, characterized in that the female nesting surface (8;8';8") is formed by a concave surface extending at most over an angle of substantially 180°.

4. Enclosure according to claim 3, characterized in that the concave nesting surface (8;8';8") is integral with the vessel (1;1';1"), respectively with the lid, at least a portion of this surface being situated above, respectively below, a plane parallel to the upper edge of the vessel and passing through the center of curvature of said concave surface.

5. Enclosure according to claim 4, characterized in that the complementary nesting surfaces (7, 8) are hemispherical surfaces.

6. Enclosure according to claim 2, characterized in that the male nesting surface (7;7") has a free end provided to be engaged along the pivot axis against the female nesting surface (8;8").

7. Enclosure according to claim 2, characterized in that the male (7;7';7") or female nesting surface integral with the lid (3;3';3") is situated at the end of an arm (6;6';6") that projects toward the outside.

8. Enclosure according to claim 2, characterized in that the male or female (8;8';8") nesting surface integral with the vessel (1;1';1") is arranged on a handle (9;9';9") of the vessel.

9. Enclosure according to claim 1, characterized in that the lid (3) has an inner (3b), respectively outer (3c) annular nesting surface extending perpendicular to the plane formed by the edge of the lid (3) adjacent to the edge (1a) of the vessel (1) and dimensioned to be nested at the inside, respectively the outside, of the opening of the vessel (1), the dimension of this surface (3b; 3c) perpendicular to said plane formed by the edge of the lid (3) being smaller in its part opposed to the articulation means (10), respectively in its part closest to the articulation means (10).

10. Enclosure according to claim 9, characterized in that the lower edge of the inner annular nesting surface (3b) has at least one recess (3d) while the inner wall of the vessel (1) has at least one positioning projection (1b) disposed to come to engage with said recess (3d) in position for closing the vessel (1).

11. Electrical household appliance for food preparation having a housing (11) forming a base (12) for receiving a vessel (1) closed by a lid (3), the vessel and the lid having articulation means (10), locking means (5) to maintain the lid in its closing position on the vessel being provided on the housing in order to cooperate with a locking surface (3a) of the lid, characterized in that the vessel (1) and lid (3) form a working enclosure in accordance with claim 1.

12. Appliance according to claim 11, characterized in that the articulation means (10) have a concave nesting surface (8) integral with the vessel (1), respectively with the lid, at least a portion of this surface being located above, respectively below, a plane passing through the center of curvature (0) of said concave surface and through the bearing point of the locking means (5) on the locking surface (3a) of the lid when said locking the articulated lid (3) on the vessel (1) in the closed position.

13. Appliance according to claim 12, characterized in that the locking means (5) come to bear on the lid (3) in a region diametrically opposed to the articulation means (10).

14. Appliance according to claim 12, characterized in that the locking means (5) come to bear on the top of the lid (3).

* * * * *